US010160143B2

(12) United States Patent
Koren

(10) Patent No.: US 10,160,143 B2
(45) Date of Patent: Dec. 25, 2018

(54) METHOD AND APPARATUS FOR MOLDING COLUMNS

(71) Applicant: Digger Specialties, Inc., Bremen, IN (US)

(72) Inventor: Robert Douglas Koren, Cary, NC (US)

(73) Assignee: DIGGER SPECIALTIES, INC., Bremen, IN (US)

( * ) Notice: Subject to any disclaimer, the term of this patent is extended or adjusted under 35 U.S.C. 154(b) by 223 days.

(21) Appl. No.: 14/991,137

(22) Filed: Jan. 8, 2016

(65) Prior Publication Data

US 2016/0200013 A1 Jul. 14, 2016

Related U.S. Application Data

(60) Provisional application No. 62/101,693, filed on Jan. 9, 2015.

(51) Int. Cl.

*B29C 41/42* (2006.01)
*B29C 41/02* (2006.01)
*B29C 41/50* (2006.01)
*B29C 41/04* (2006.01)
*B29C 41/38* (2006.01)
*B29K 67/00* (2006.01)
*B29L 23/00* (2006.01)

(52) U.S. Cl.

CPC ............ *B29C 41/50* (2013.01); *B29C 41/042* (2013.01); *B29C 41/38* (2013.01); *B29K 2067/00* (2013.01); *B29L 2023/22* (2013.01)

(58) Field of Classification Search

CPC ....... B29C 41/50; B29C 41/042; B29C 41/38; B29C 41/42; B29C 33/42; B29C 67/0014; B29C 67/0025; B29L 2031/766; B29L 2023/22; B29L 2023/00

USPC .......................................................... 264/503

See application file for complete search history.

(56) References Cited

U.S. PATENT DOCUMENTS 5,667,744 A * 9/1997 Valle ........................ B29C 33/42 264/225
5,858,294 A 1/1999 Del Valle et al.
2015/0290864 A1* 10/2015 Beck ........................ B29C 49/04 220/86.1

* cited by examiner

*Primary Examiner* — Alison L Hindenlang
*Assistant Examiner* — Mohamed K Ahmed Ali
(74) *Attorney, Agent, or Firm* — Coats & Bennett, PLLC

(57) ABSTRACT

A column or other elongate molded part is molded using an elongate tubular mold having a closed end, an open end and a flexible sidewall. After the column or other molded part is formed, it is extracted from the mold by pulling the column or other molded part axially through the open end of the mold. The inner surface of the mold may comprise a recessed or protruding form to mold a protruding or sunken relief on or in an exterior surface of the molded part. The column may be extracted using an expandable plug that is inserted into the interior of the column or other molded part through the open end of the mold. The expandable plug is expanded to engage and seal against an inner surface of the elongate molded part. A pressurized gas is introduced into the interior of the elongate molded part through the plug to expand the mold before pulling the column through the open end of the mold.

11 Claims, 20 Drawing Sheets

5

10
44
45
47
62
62
40
20
26
50
54
58
60
48
48
30
94
94
70
72
76
90
92
74

METHOD AND APPARATUS FOR MOLDING COLUMNS

RELATED APPLICATION

The present invention claims the benefit of U.S. Provisional Application Ser. No. 62/101,693 filed 9 Jan. 2015, the disclosure of which is incorporated by reference herein in its entirety.

TECHNICAL FIELD

The present invention relates generally to molded columns and, more particularly, to methods and apparatus for manufacturing molded columns.

BACKGROUND

Columns are widely used in both residential and commercial buildings. Until recently, most columns used in residential construction have been made from wood. Molded columns, however, have some advantages over traditional wood columns and have been gaining in popularity. Some of the advantages of molded columns include lower costs, a wider variety of designs, and improved structural strength.

One technique for making molded columns is centrifugal molding. A viscous resin material is poured into an elongated mold having two parts. The mold is spun at high speed to force the molding material against the inner surface of the mold. When the molding material has set, the mold is opened and the column is removed.

One drawback to centrifugal molding is that the mold leaves two longitudinally extending seam lines or ridges where the mold separates. The seam lines or ridges must be removed to provide a smooth exterior surface. Typically, the seam line or ridge is removed by manually sanding the column. However, the manual sanding of molded columns is time consuming and labor intensive. The time and labor needed to sand the column translates into higher cost and lower production.

SUMMARY

The present invention relates generally to the manufacture of molded columns by centrifugal or rotational molding processes. The columns are molded in an elongate tubular mold that is closed at one end and open at the opposite end for forming the molded parts. The mold includes a flexible sidewall that is made of a resilient material that can radially expand and return to its original condition. The sidewall of the mold is made of a single piece and does not include a parting line. The inner surface of the mold may comprise a recessed or protruding form to mold a protruding or recessed relief on or in an exterior surface of the molded part. After the column is formed, pressurized gas is introduced to the interior of the mold. The pressurized gas expands the sidewall to separate the sidewall of the mold from an exterior surface of the column. The column can then be pulled axially through the open end of the mold, even when the exterior surface of the column includes protruding or recessed details.

Another aspect of the disclosure comprises a gripping tool used to extract the column from the mold. The gripping tool is inserted into the interior of the column through the open end of the mold. The gripping tool is expanded to engage an inner surface of the column. The gripping tool includes an eyelet or other feature that is engaged by a pulling device to pull the column from the mold.

In some embodiments, the gripping tool comprises an expandable plug having a flexible sidewall. Pressurized gas is supplied to an interior of the expandable plug to expand the sidewall of the expandable plug into contact with the inner surface of the column. When the expandable plug is in place, pressurized gas is introduced into the interior of the elongate molded part through the plug to expand the mold before pulling the column through the open end of the mold.

In other embodiments, the gripping tool comprises a shaft and two or more wing members pivotally connected to the shaft. The wing members are configured to expand when pivoted away from said shaft and to retract when pivoted toward said shaft. Biasing members may be provided to bias the wing members towards and expanded position.

Although this disclosure focuses on the manufacture of molded columns, the techniques herein described are more generally applicable to any elongate molded part.

DETAILED DESCRIPTION

Figure 1:
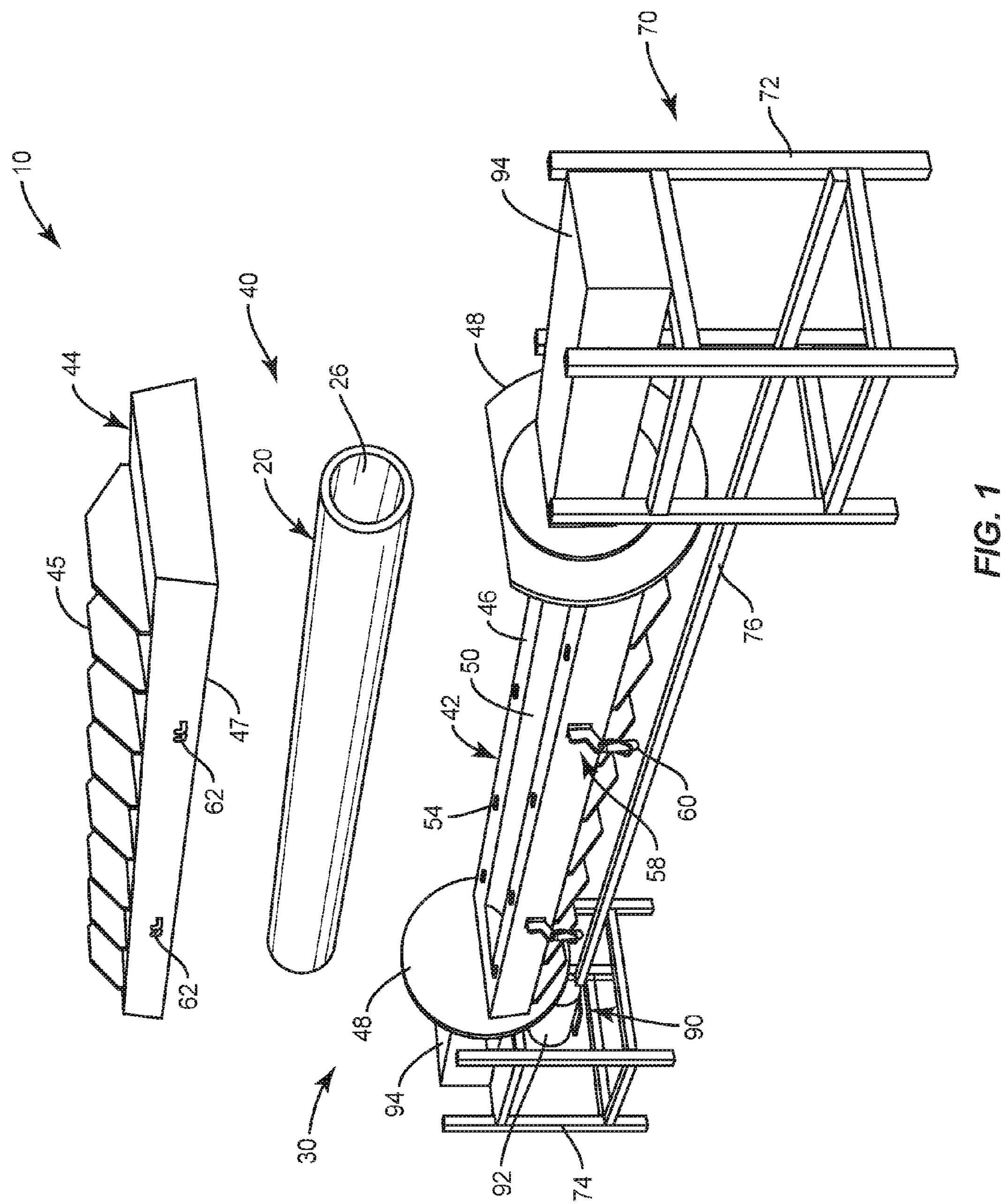
FIG. 1 is an exploded perspective view of a molding apparatus for molding columns including a mold and mold housing.

Referring now to the drawings, a molding apparatus 10 and extraction equipment 100 according to an exemplary embodiment of the disclosure is shown. The molding apparatus 10, in general, is used to mold a column 5 from a suitable molding material by centrifugal or rotational molding. To briefly summarize, the molding material, such as a polyester resin, is poured into a mold 20. The molding material is initially in a viscous state, and subsequently hardens to form the molded part. In one embodiment, the molding material comprises a blend of polyester resin and powdered marble containing approximately 25% to 35% polyester resin. The mold 20 is rotated by a spinning machine 30 so that the centrifugal force causes the molding material to flow against the inner surface of the mold 20. The mold 20 is rotated until the molding material has had sufficient time to set thus forming a column 5. Extraction equipment 100 is then used to extract the molded column 5 from the mold.

As will be described in more detail below, the mold 20 is a single piece mold that is open at one end. The molded column 5 is extracted by pulling the molded column 5 axially through the open end of the mold 20. Single piece molds have not been used in the past because of the difficulty of extracting the molded part from the mold 20. If the molded column 5 does not release from the inner surface of the mold 20, pulling the molded column 5 through the mold 20 may mar the molded column 5 and/or damage the mold 20. Another problem is that the molded columns 5 may include features, such as rings, astragals or sculptural reliefs, that normally prevent the molded column 5 from being extracted in an axial direction. This disclosure describes techniques for axially extracting a molded column 5 or other elongate structure from a mold without marring the surface of the molded part or damaging the mold. The techniques herein described may be used even when the molded part includes rings, sculptural reliefs, or other profiles that would normally prevent axial extraction of the molded part from the mold 20.

FIG. 1 is an exploded perspective view of an exemplary molding apparatus 10 for making columns 5 or other elongate members. The molding apparatus 10 generally comprises a mold 20 for forming the molded part and a spinning machine 30 for rotating the mold 20 while the molded part is being formed.

Figure 5:
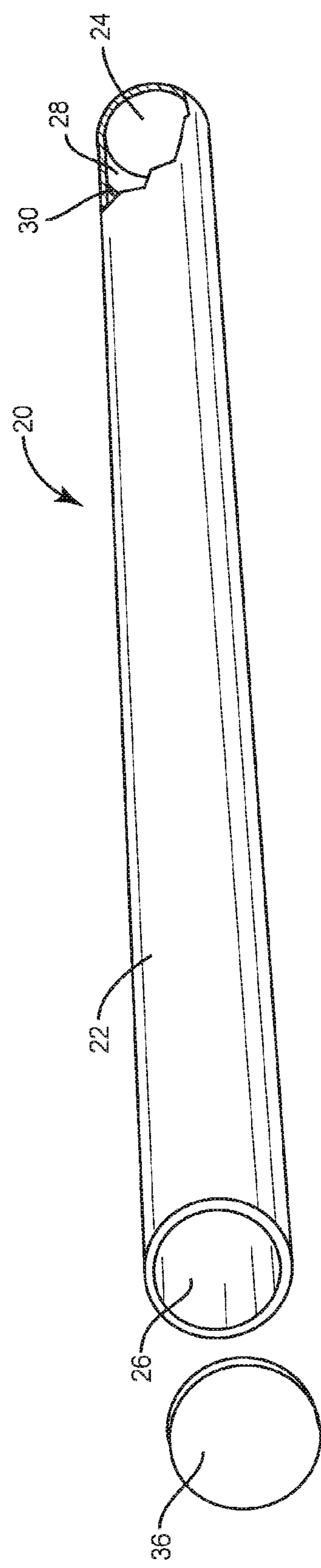
FIG. 5 is a perspective view of an exemplary mold and end cap for sealing the open end of the mold.

FIG. 5 illustrates an exemplary mold 20. The mold 20 comprises a flexible sidewall 22, a closed end 24, and an open end 26. The flexible sidewall 22 is made of a resilient material, e.g., silicone rubber, that can radially expand and return to its original condition. The sidewall 22 of the mold 20 is preferably made of a single piece and does not include a parting line. The sidewall 22 includes an inner surface 28 that conforms to the desired shape of the molded column 5. In this example, the inner surface 28 of the mold 20 generally defines a generally circular cylinder that tapers outwardly from the upper end of the column 5 to the lower end of the column 5. It will be appreciated, however, that the mold 20 may be designed to produce columns 5 of virtually any geometric shape including square columns 5, rectangular columns 5, oval or elliptical columns 5, or hexagonal columns 5. The column 5 may include recessed or protruding features such as flutes, rings, sculptural reliefs, or other molded profiles that extend out of or into the exterior surface of the column 5. Therefore, the inner surface 28 of the sidewall 22 may include a recessed or protruding form to mold a protruding or recessed feature or in an exterior surface of the column 5. In the exemplary embodiment shown in FIG. 5, the inner surface 28 of the mold 20 includes an annular channel 30 having the profile of a desired architectural molding for forming a ring or astragal that encircles or surrounds the exterior surface of the column 5.

The spinning machine 30, as previously described, rotates the mold 20 while the column 5 or other molded part is being formed. The spinning machine 30 comprises a mold housing 40, support frame 70, and drive assembly 90. The mold 20 inserts into a cavity 50 in the mold housing 40. The mold housing 40 is rotatably mounted to the support frame 70. A drive assembly 90 including a drive motor 92 rotates mold housing 40 about a longitudinal axis that coincides with the center line of the mold 20. The rotation of the mold 20 within the mold housing 40 cause the material in the mold 20 to flow radially outward into contact with the inner surface 28 of the sidewall 28. The rotation of the mold 20 continues until the molding material sets.

The mold housing 40 is illustrated in FIGS. 1-4. The mold housing 40 includes a first housing section 42 and second housing section 44 which may be separated. The first and second housing sections 42, 44 comprise box-like casings made of wood, metal fiberglass, or other suitable material that are filled with epoxy. Stiffening members 45 are affixed to outer surface of the housing sections 42, 44 to impart strength and rigidity to the housing section 42, 44. The first and second housing sections 42, 44 include flat mating surfaces 46 and 47 formed by the epoxy filling. The epoxy filling in the first and second housing sections 42, 44 define a cavity 50 configured to receive the mold 20. The cross-section of the cavity 50 when the mold housing 40 is assembled conforms to the exterior cross-section of the mold 20. The cavity 50 is long enough to receive the mold 20 with a small gap between the open end 26 of the mold 20 and the end of the cavity 50 to receive an end cap 36 (FIG. 5) used to close the open end 26 of the mold 20 during the molding process.

In some embodiments, the mating surfaces 46, 47 of the first and second housing sections 42, 44 may include complimentary locating features 54 for aligning the first and second housing sections 42, 44. The first and second housing sections 42, 44 are secured together by latches 58. The type of latch is not a material aspect of the mold housing 40. For example, the latches 58 may comprise conventional draw latches including a first latch part including a loop 60 that engages with a second latch part including a hook 62.

The mold housing 40 includes mounting plates 48 attached at each end of the first housing section 42. A mounting shaft 52 extends from each mounting plate 48 along the longitudinal centering of the mold housing 40 for rotatably mounting the mold housing 40 to a support frame 70.

The support frame 70 includes first and second frame sections 72, 74 disposed at opposite ends of the mold housing 40. The first and second frame sections 72, 74 may be interconnected by connecting members 76. In one exemplary embodiment, the first and second frame sections 72, 74 include pillow bearings 78 (FIG. 6) shielded by an enclosure to receive the mounting shafts 52 extending from opposite ends of the mold housing 40.

Figure 6:
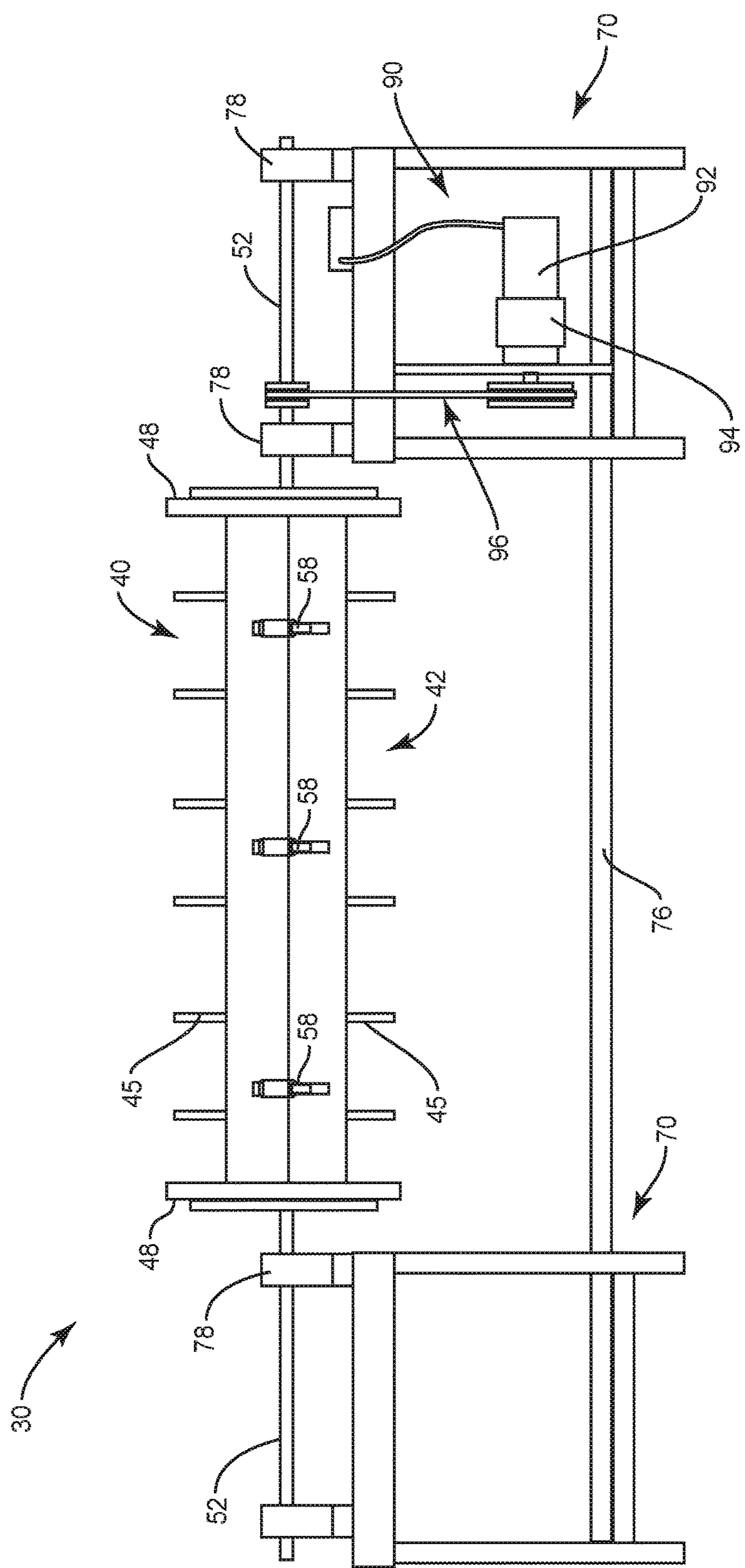
FIG. 6 illustrates a spinning apparatus for rotating the mold.

A drive assembly 90 including a motor 92 is provided for rotating the mold housing 40. In some embodiments, a direct drive arrangement may be used wherein the motor 92 is directly coupled to one of the mounting shafts 52 and rotates the mold housing 40. In one embodiment, a gear box 94 and drive pulley arrangement 96 may be interconnected between the drive motor 92 and mounting shaft 52 at one end of the mold housing 40 as shown in FIG. 6. The particular arrangement of the drive assembly 90 is not a material aspect of the disclosure. In the embodiment shown in FIG. 6, a drive pulley is mounted to the output shaft of gearbox 94 and is connected by a belt to a driven pulley on one of the mounting shafts 52.

Figure 2:
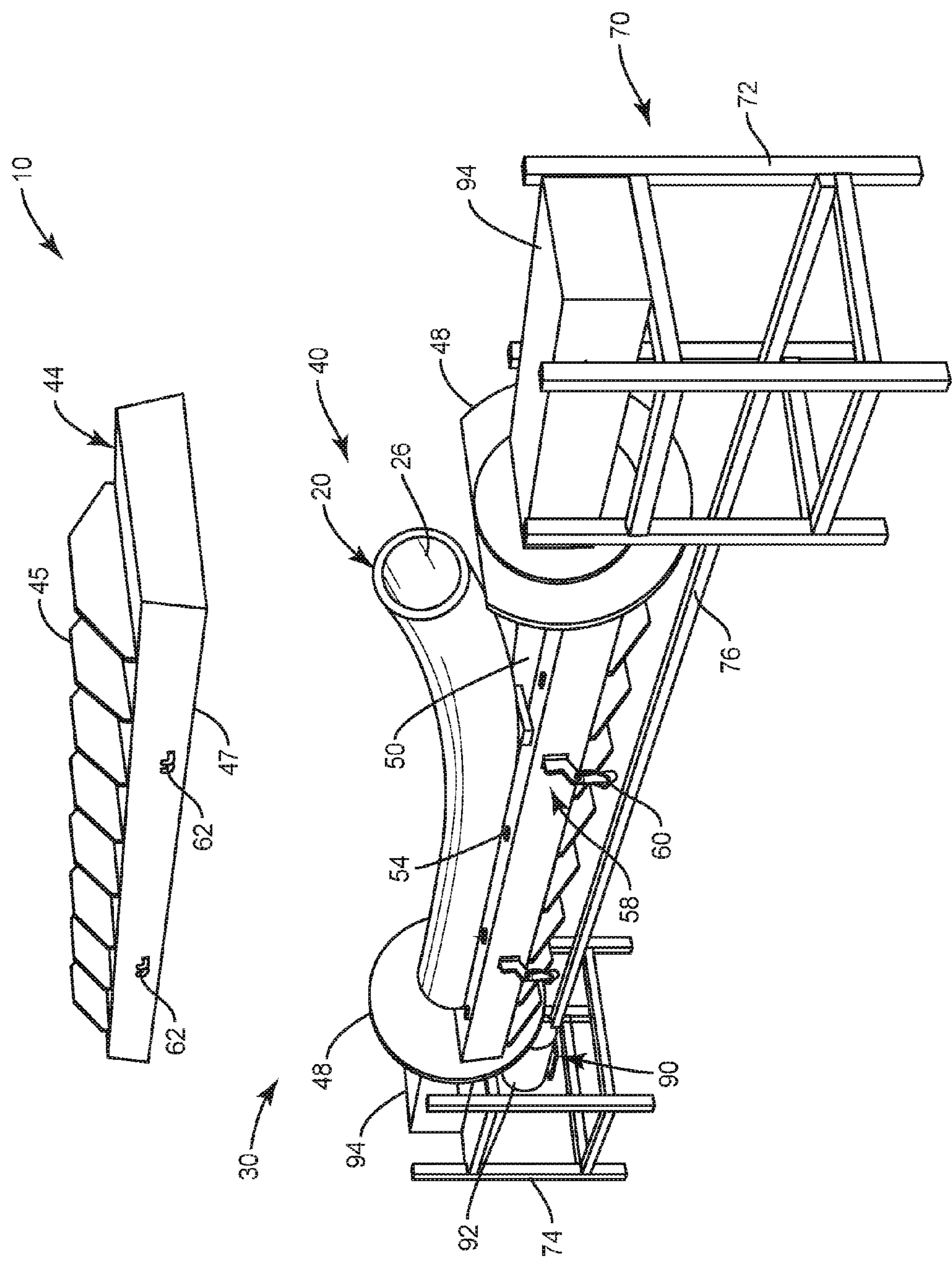
FIG. 2 is a perspective view of the molding apparatus with the mold inserted into an open mold housing and open end of the mold raised to allow introduction of molding material into the mold.
Figure 3:
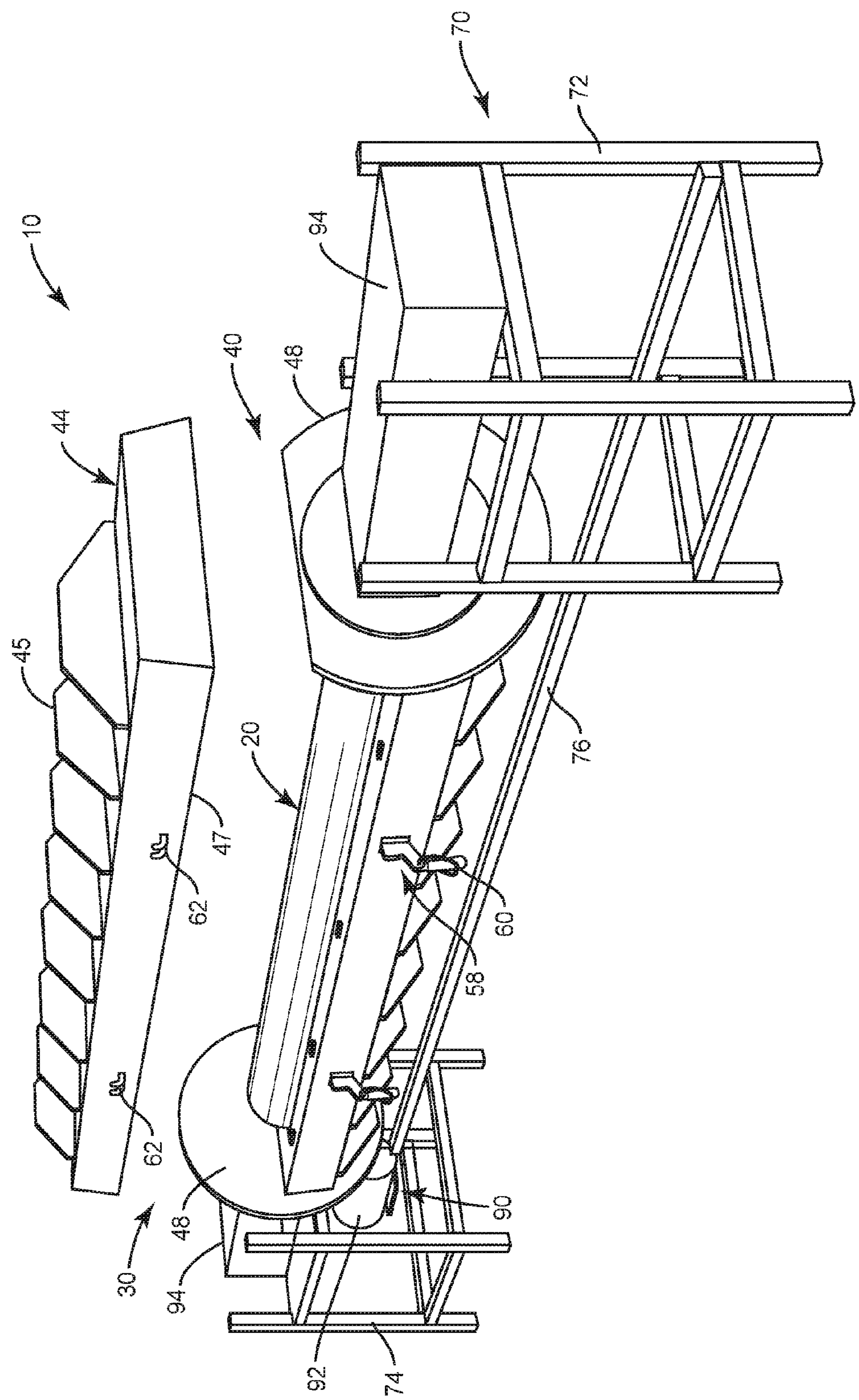
FIG. 3 is a perspective view of the molding apparatus with the mold inserted into the open mold housing.
Figure 4:
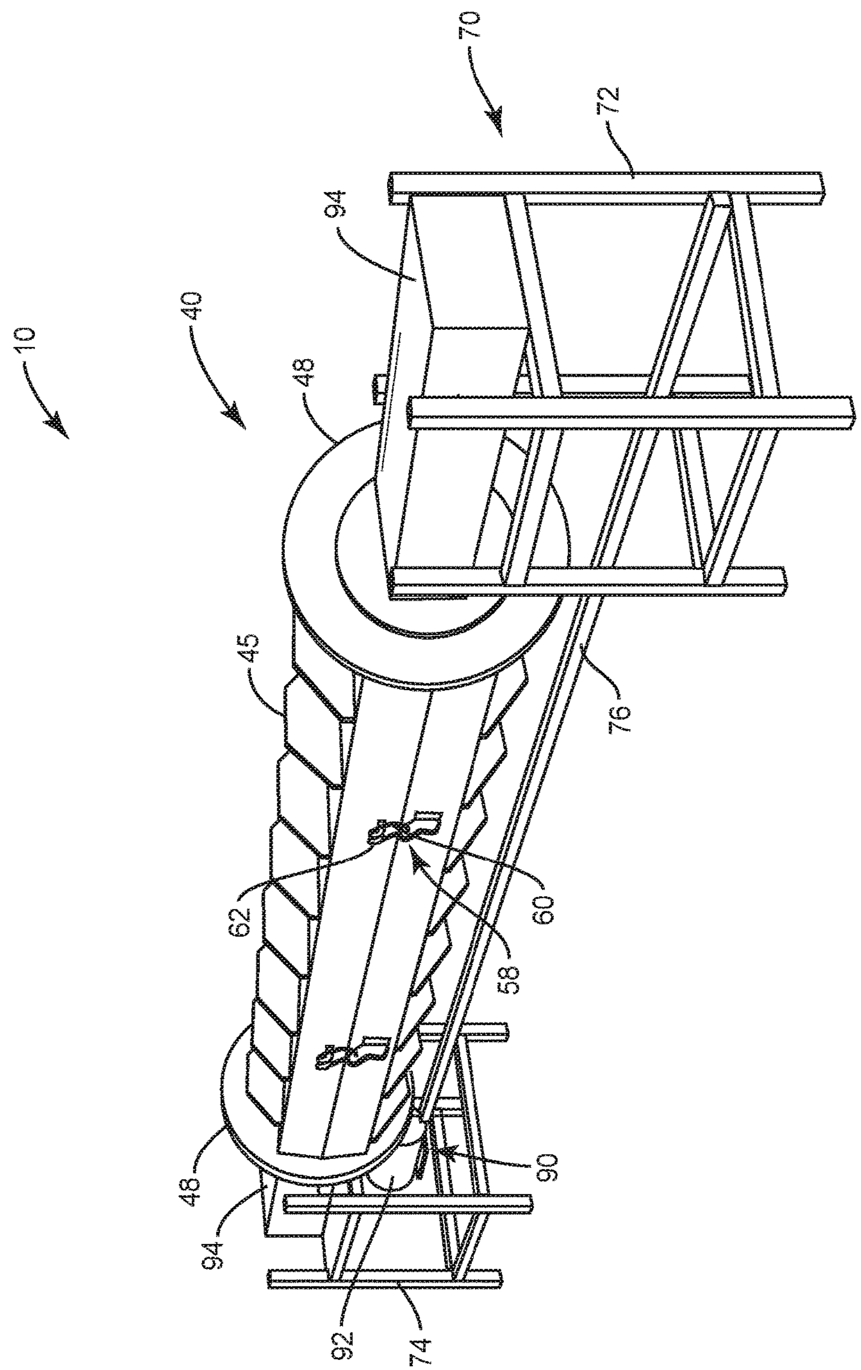
FIG. 4 is a perspective view of the molding apparatus with the mold housing closed.

FIGS. 2-4 illustrate an exemplary process for making a molded column 5 using the molding apparatus 10. The mold 20 is inserted into the mold cavity 50 and the open end 26 of the mold 20 is elevated (FIG. 2). A block may be inserted beneath the mold 20 as shown in FIG. 2 to help hold the open end 26 of the mold 20 in an elevated position. A molding material is poured into the open end 26 of the mold 20. Once the molding material is poured into the mold 20, the open end 26 is lowered into the mold cavity 50 of the second housing section 44 and the end cap 36 is inserted between the open end 26 of the mold 20 and the end wall of the cavity 50 to seal the mold 20 (FIG. 3). The second housing section 44 is then lowered onto the first housing section 42 and the latches 58 are engaged to secure the first and second housing sections 42, 44 together (FIG. 4).

The mold housing 44 and mold 20 are then rotated for a predetermined period of time depending upon the properties of the molding material. In general, the mold housing 40 and mold 20 are rotated for a sufficient amount of time to allow the molding material to set and form the molded column 5. When the mold 20 is rotated, the material inside the mold 20 flows outward against the inner surface 28 of the mold 20. Once the molding material has had sufficient time to set, the rotation of the mold 20 is stopped and the mold 20 is removed from the mold housing 40. The extraction equipment 100 is then used to extract the molded column 5 from the mold 20.

Figure 7:
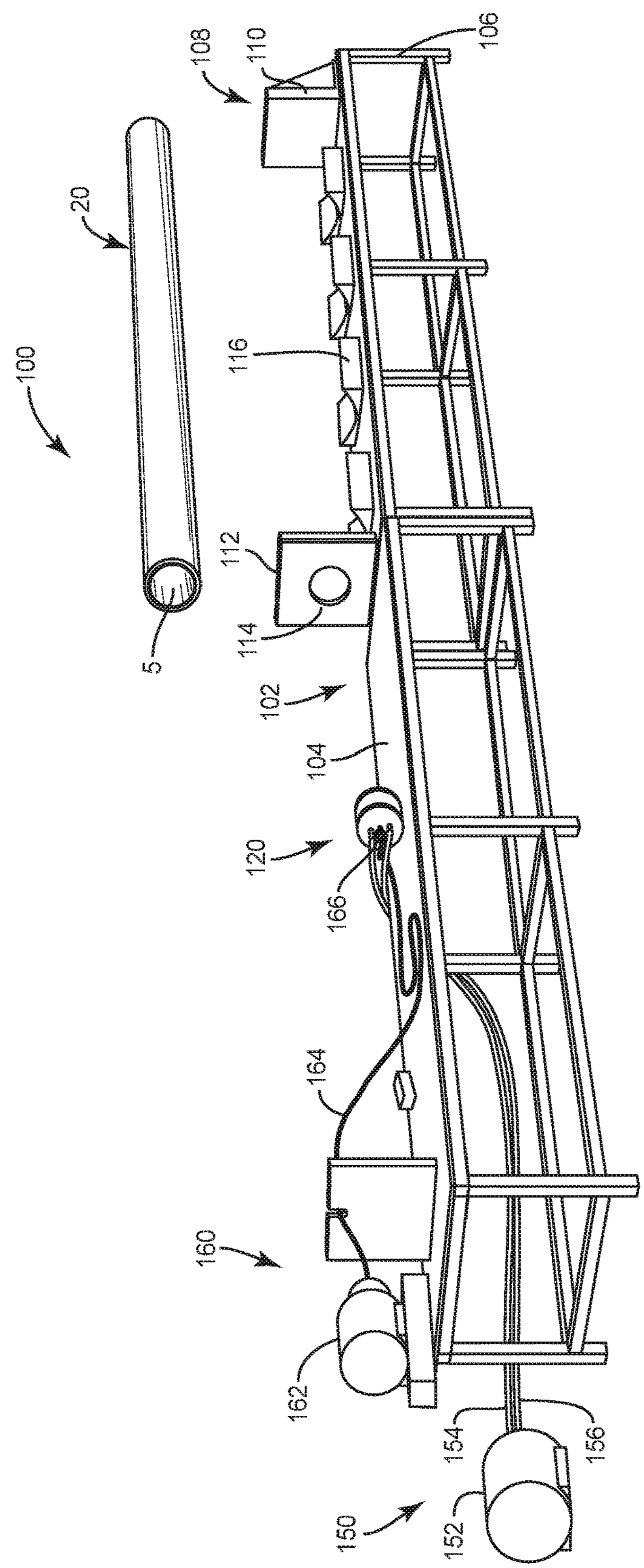
FIG. 7 is a perspective view of an apparatus for extracting molded columns from molds.

FIG. 7 illustrates the extraction equipment 100 used to extract the molded column 5 from the mold 20. The extraction equipment 100 generally comprises a work table 102, a holding fixture 108 disposed on the work table 102, an expandable plug 120 for insertion into the molded column 5, an air supply system 150 for supplying air to the interior of the molded column 5, and a pulling device 160 for pulling the molded column 5 from the mold 20.

The work table 102 comprises an elongated work surface 104 that is supported by a support frame 106. The holding fixture 108 is disposed at one end of the work surface 104. The holding fixture 108 comprises end plates 110,112 and one or more supports 116. When the mold 20 is inserted into the holding fixture 108, the closed end of the mold is placed against the end plate 110 while the open end 26 of the mold 20 is disposed towards end plate 112. End plate 112 includes an opening 114 that is large enough for the molded column 5 to pass through. The supports 116 include arcuate support surfaces that generally conform to the shape of the mold 20. When the mold 20 is placed in the holding fixture 108, the supports 116 support the mold 20 so that the mold 20 is actually aligned with the opening 114 in the end plate 112.

Figure 8A:
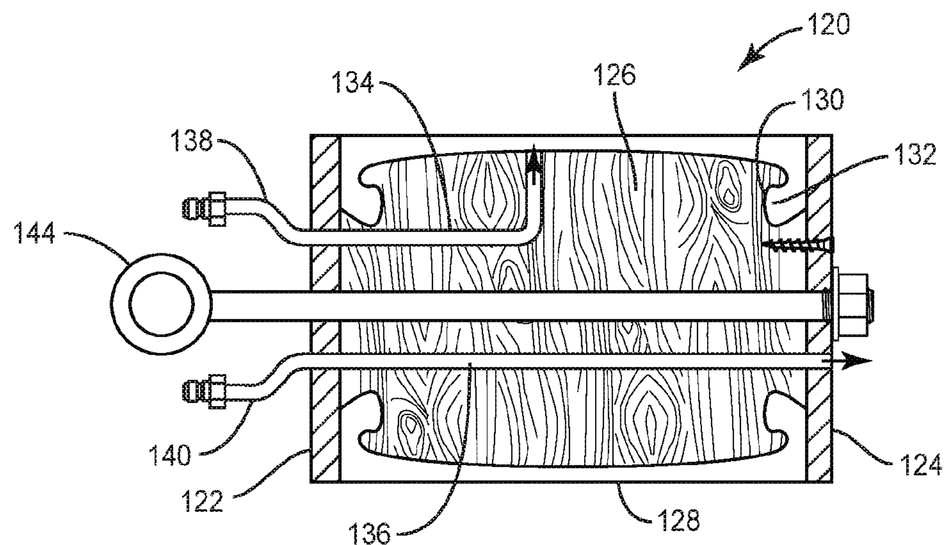
FIGS. 8A and 8B illustrate an expandable plug for pulling a molded column from a mold.
Figure 8B:
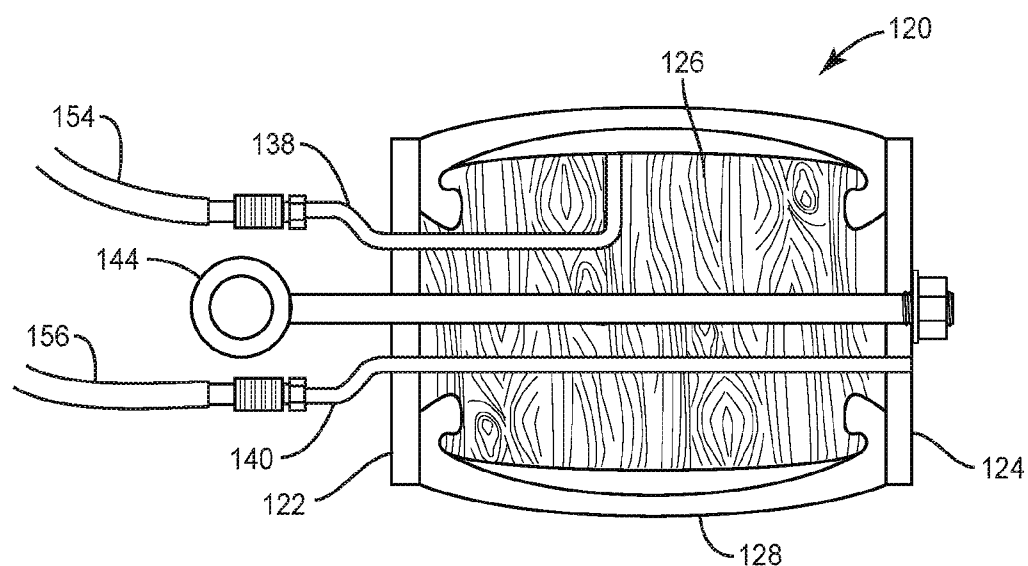

The expandable plug 120, shown in FIGS. 8A and 8B, is configured to be inserted through opening 114 in end plate 112 and the open end 26 of the mold 20 into the interior of the molded column 5. The expandable plug 120 functions as a gripping tool to grip and inner surface of the molded column 5. The expandable plug 120 includes an outer plate 122, inner plate 124, core member 126, and flexible side wall 128. The outer plate 122 and inner plate 124 are secured to the core member 126 by screws, bolts or other suitable fasteners. The outer plate 122, inner plate 124, and core member 126 may be made of wood or plastic material. The sidewall 128, which may be made of a natural rubber, synthetic rubber, or other elastic material, surrounds the core member 126. The core member 126 includes channels 130 that interlock with protrusions 132 at the ends of the sidewall 128 to hold the sidewall 128 in place. A first air passage 134 in the core member 126 communicates with the space between the core member 126 and sidewall 128. A second air passage 136 extends through the end plate 122, core member 126 and end plate 124 to communicate with the interior of the molded column 5. The first and second air passages 134, 136 connect to inlet tubes 138, 140 with quick connect couplings for coupling the inlet tubes 138, 140 to air supply lines 154, 156 as hereinafter described. An eyelet 144 is secured to the core member 126. As will be described in more detail below, the eyelet 144 is used to pull the molded column 5 from the mold 20.

Referring back to FIG. 7, the air supply system 150 comprises an air compressor 152 and air supply lines 154,156. The air compressor 152 serves as a source of pressurized gas and may comprise two outlets that provide air at different pressures. Alternatively, the source of pressurized gas may comprise two separate air compressors, each providing air at a different pressure. A first air supply line 154 connects a first outlet of the air compressor 152 to the first inlet tube 138 of the expandable plug 120. A second air supply line 156 connects a second outlet of the air compressor 152 to the second air tube 140 of the expandable plug 120. As will be described in more detail below, the air pressure applied via the first air supply line 154 to the interior of the expandable plug 120 should be sufficient to prevent the ejection of the plug 120 when the interior of the column 5 in pressurized and to provide enough gripping force to pull the molded column 5 through the open end 26 of the mold 20.

Figure 9A:
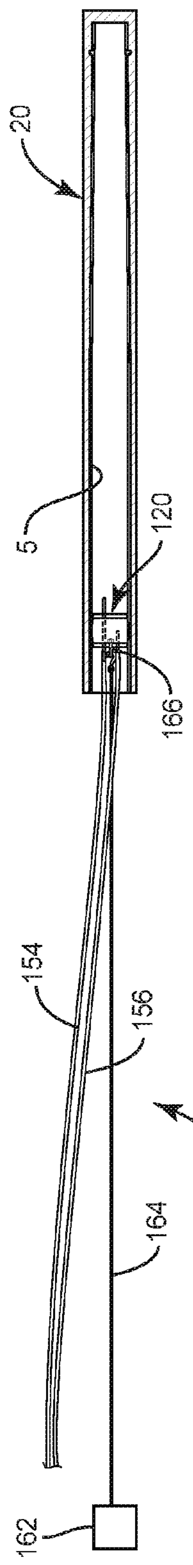
FIGS. 9A-9C are schematic diagrams illustrating the basic process of extracting a molded column from a mold.
Figure 9B:
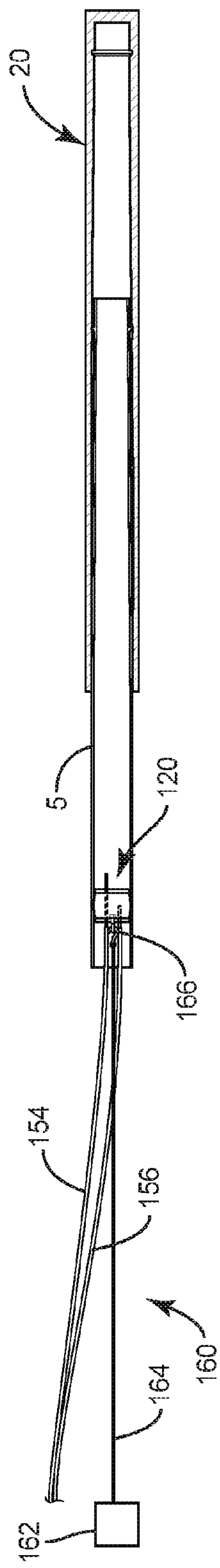
Figure 9C:
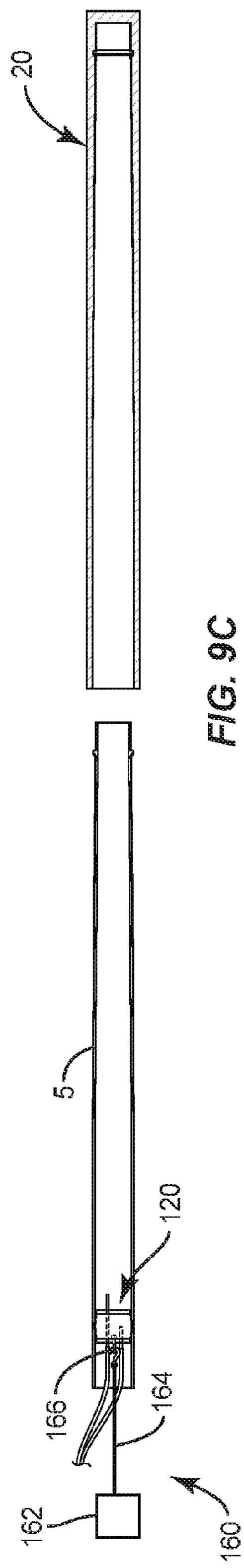

The pulling device 160, shown in FIGS. 9A-9C, comprises a winch 162 and cable 164. A hook 166 is disposed at the free end of the cable 164. The hook 166 is configured to engage with the eyelet 144 on the expandable plug 120. When the winch 162 is actuated, the cable 164 and hook 166 apply an axial force to the expandable plug 120 to pull the molded column 5 out through the open end 26 of the mold.

FIGS. 9A-9C schematically illustrates the process for extracting the molded column 5 from the mold 20. FIG. 9A shows the expandable plug 120 inserted into the molded column 5 through the open end 26 of the mold 20. Air supply lines 154 and 156 are connected respectively to the first and second air tubes 138,140 respectively. The hook 66 of the cable 164 is engaged with the eyelet 144 on the expandable plug 120. In one embodiment, air pressure in the range of about 10-40 psi is applied via the first air supply line 154 to the interior of the expandable plug 120 causing the sidewall 128 of the expandable plug 120 to expand radially outward and engage the inner surface of the molded column 5. The engagement of the sidewall 128 of the expandable plug 120 with the inner surface of the molded column 5 also seals one end of the molded column 5. In one embodiment, air pressure in the range of about 20-80 psi is then applied via the second air supply line 156 to the interior of the molded column 5. As will be described in more detail below, the air pressure supplied to the interior of the molded column 5 causes the mold 20 to expand and release from the molded column 5 so that the molded column 5 can be pulled through the open end 26 of the mold 20. In FIG. 9B, the winch 162 is actuated while air is applied to the interior of the column 5 to pull the molded column 5 through the open end 26 of the mold 20. FIG. 9C shows the column 5 fully extracted from the mold 20.

Figure 10A:
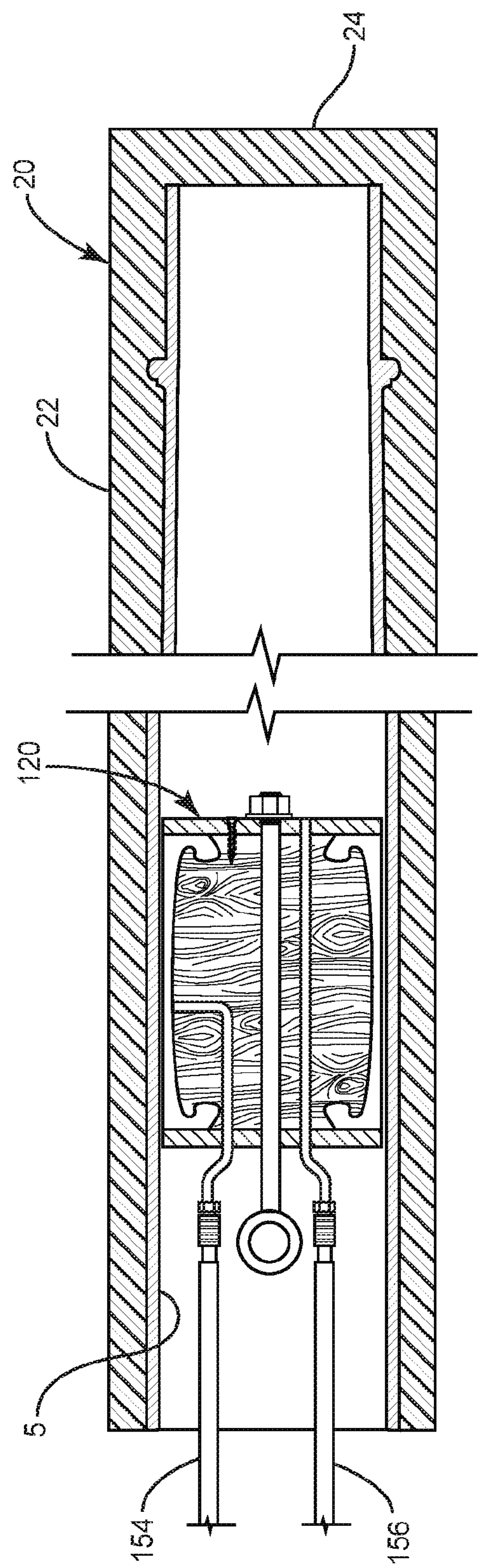
FIGS. 10A-10G illustrates a method of using air pressure to extract a molded column from a mold.
Figure 10B:
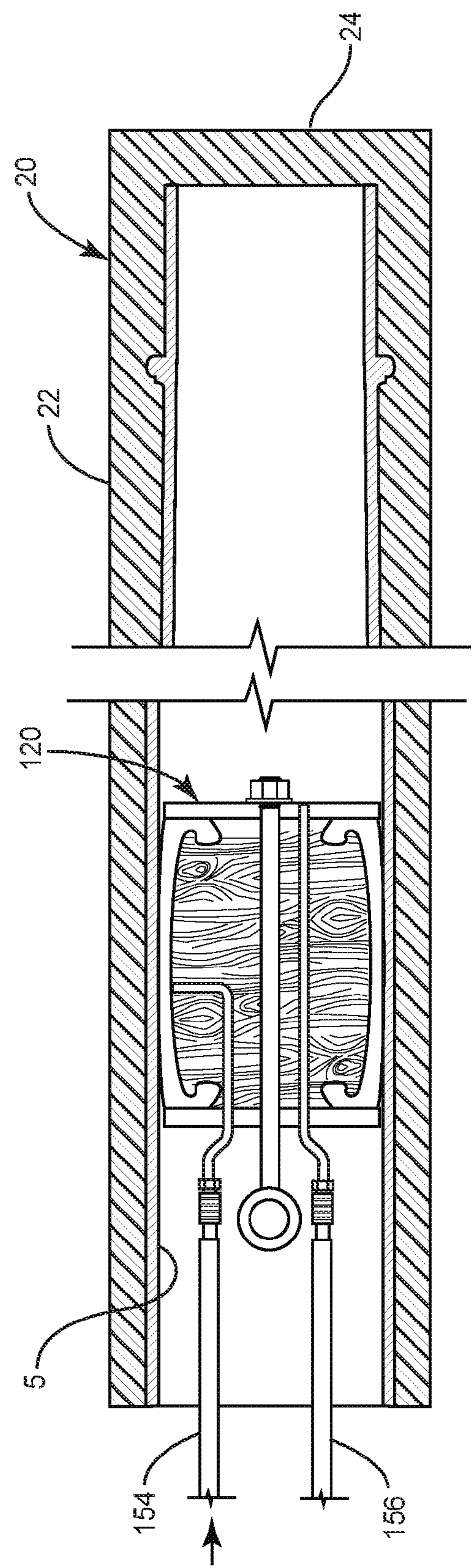
Figure 10C:
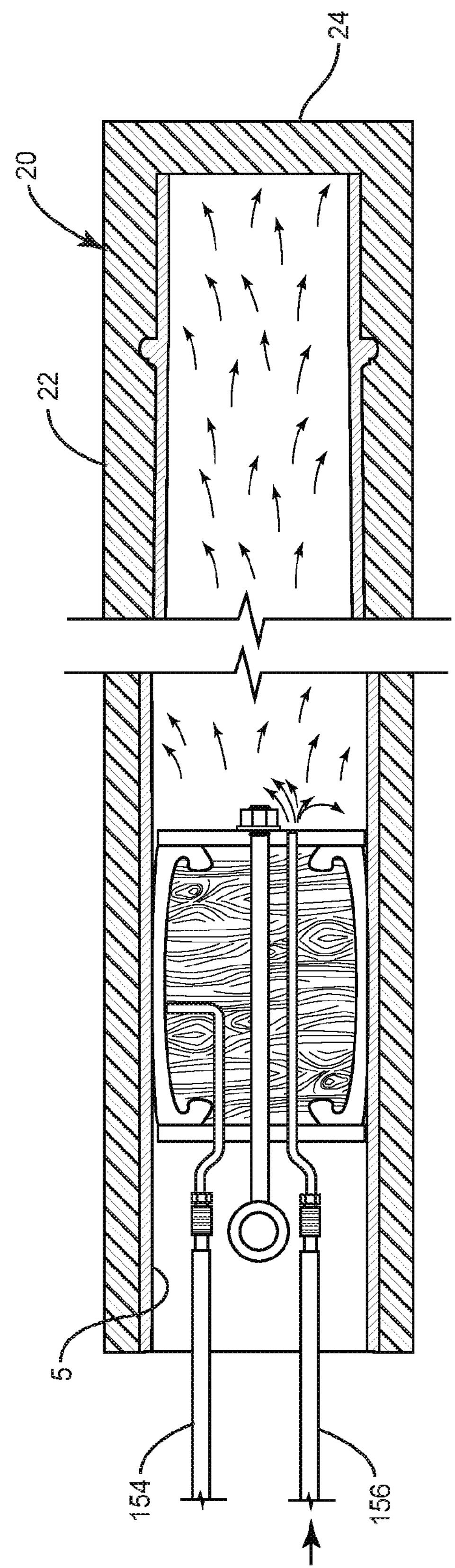
Figure 10D:
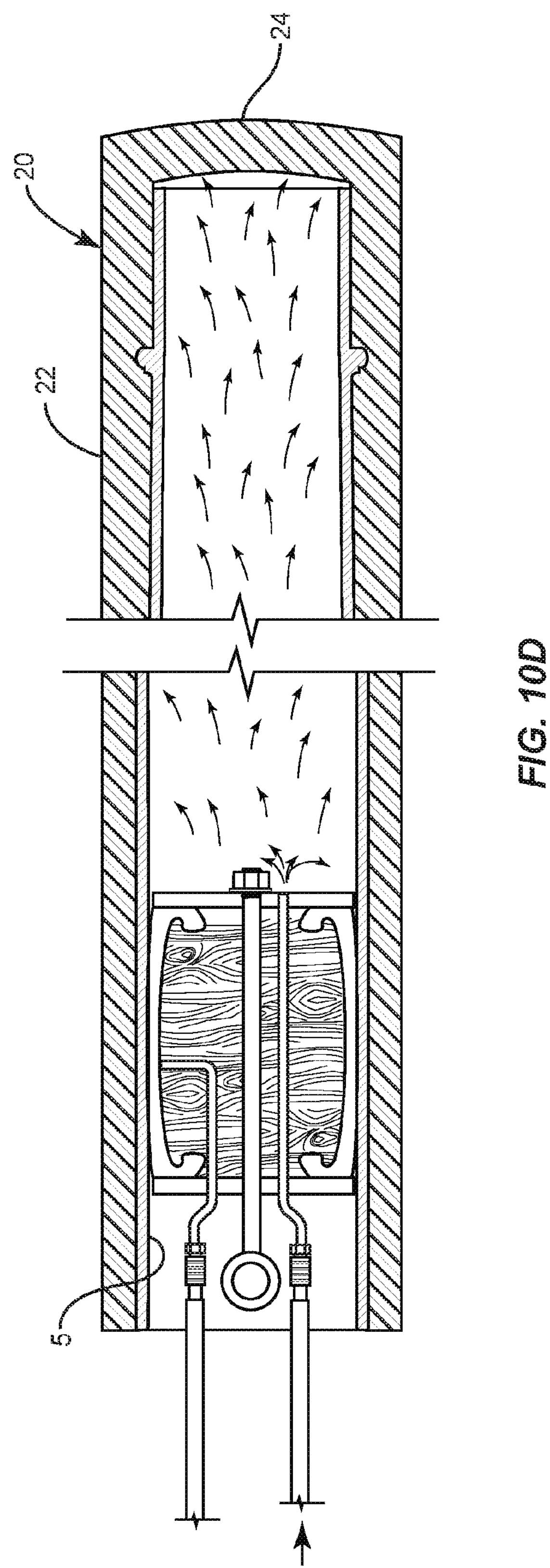
Figure 10E:
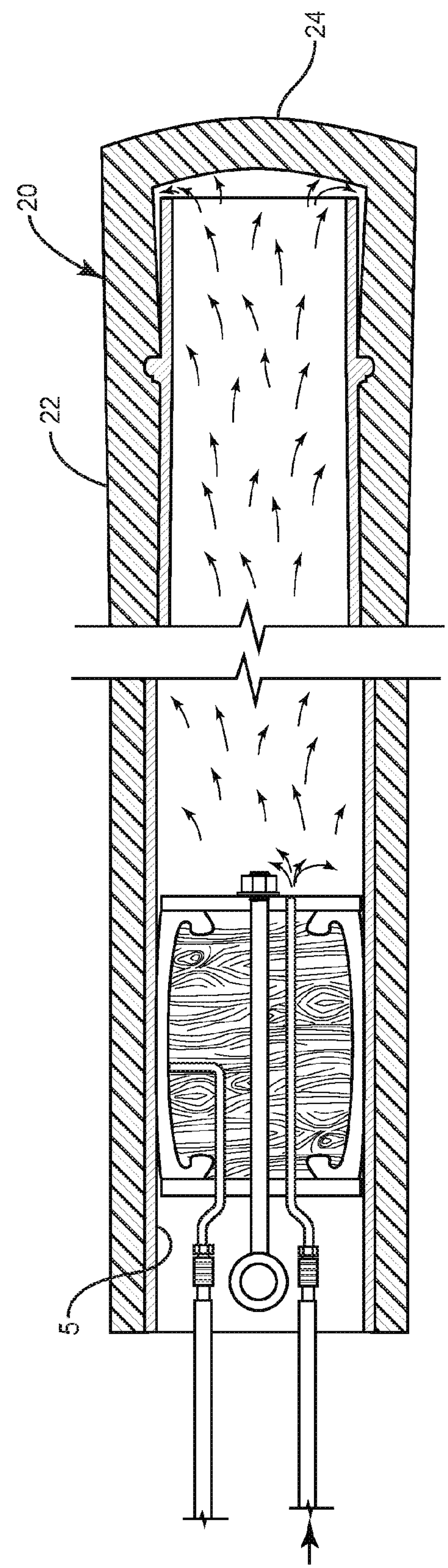
Figure 10F:
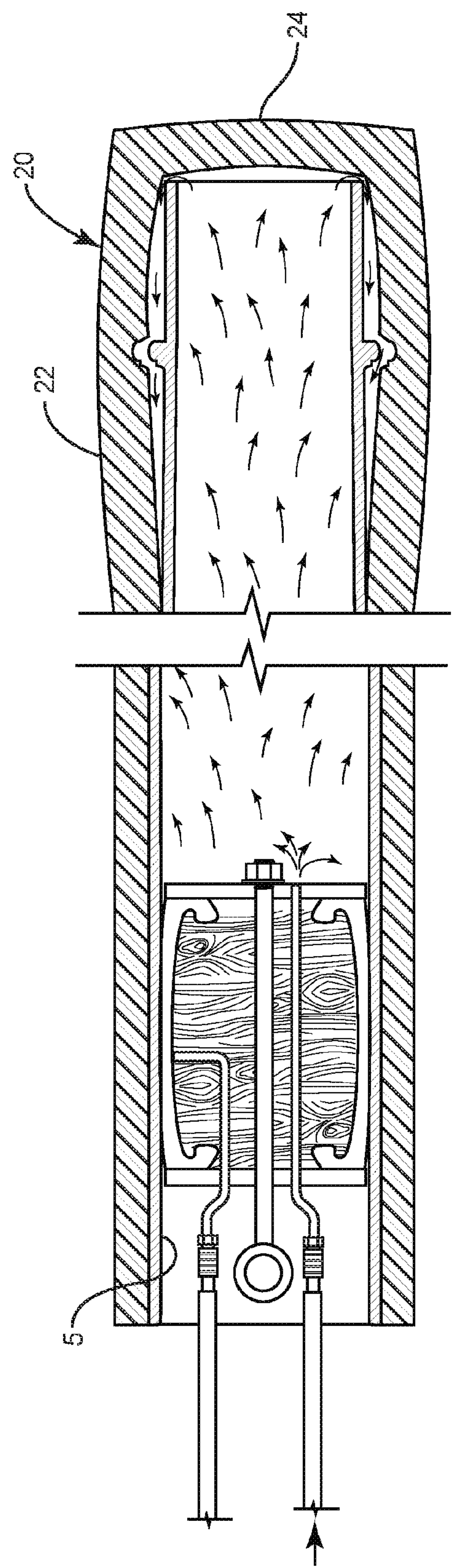
Figure 10G:
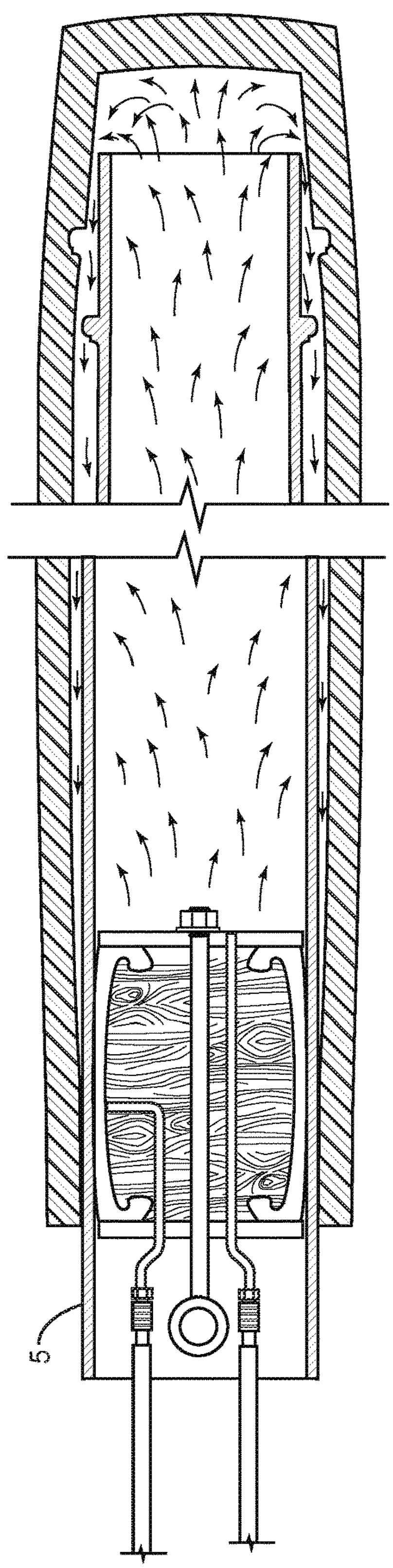

FIGS. 10A-10G illustrate in more detail how air pressure supplied to the interior of the molded column 5 facilitates extraction of the molded column 5 from the mold 20. FIG. 10A shows the expandable plug 120 inserted into the interior of the molded column 5. In FIG. 10B, air pressure is supplied via air supply line 154 to the interior of the expandable plug 120. The air pressure inside the expandable plug 120 causes the sidewall 128 of the expandable plug 120 to radially expand into engagement with the inner surface of the molded column 5. Once the expandable plug 120 expands into engagement with the inner surface of the molded column 5, air pressure is supplied via the second air supply line 156 to the interior of the molded column 5 as shown in FIG. 10C. As shown in FIG. 10D, the air pressure inside the molded column 5 initially causes the closed end 24 of the mold 20 to bulge outward. The air then infiltrates between the exterior surface of the molded column 5 and the inner surface 28 of the mold 20. as shown in FIG. 10E The infiltration of air between the exterior surface of the molded column 5 and inner surface 28 of the mold 20 causes the sidewall of the mold 20 to expand radially outward and separate or release from the molded column 5 as shown in FIGS. 10F and 10G. In other words, the air infiltrating between the exterior surface of the molded column 5 and inner surface 28 of the mold 20 breaks the mold 20 free from the molded column 5. The molded column 5 may then be pulled axially through the open end 26 of the mold 20.

A wide range of air pressures may be used during the column 5 extraction process. In general, increasing the pressure applied to the interior of the column 5 results in faster release of the mold 20 from the exterior surface of the molded column 5 so that the molded column 5 can be extracted sooner. The air pressure applied to the interior of the expandable plug 120 should be sufficient to prevent the ejection of the expandable plug 120 when the interior of the molded column 5 is pressurized and to provide sufficient gripping force to pull the molded column 5 from the mold 20. While the pressure applied to the expandable plug 120 may be greater than the pressure applied to the interior of the column 5, such is not necessary. It has been found that an air pressures of about 30 psi for the interior of the expandable plug 120 and 60 psi for the interior of the molded column 5 works well for the most common column 5 sizes.

When the mold 20 is properly inflated, the mold 20 will separate from the exterior surface of the molded column 5 allowing the winch 162 to easily remove the molded column 5 from the mold 20. If the winch 162 is actuated too early, unnecessary stress may be exerted on the mold 20 and the expandable plug 120. One issue is that pulling on the expandable plug 120 before the mold 20 releases from the exterior surface of the molded column 5 generates a shear which could damage the molded column 5 or the mold 20. Further, if the pulling force is applied before the molded column 5 is released from the inner surface of the mold 20, the winch 162 is pulling not just the molded column 5 but is also compressing the end of the mold 20 against the plate 112. When the molded column 5 finally releases with the inner surface 28 of the mold 20, the molded part will suddenly lurch forward. Excessive shear forces may also cause damage to the expandable plug 120.

Figure 11A:
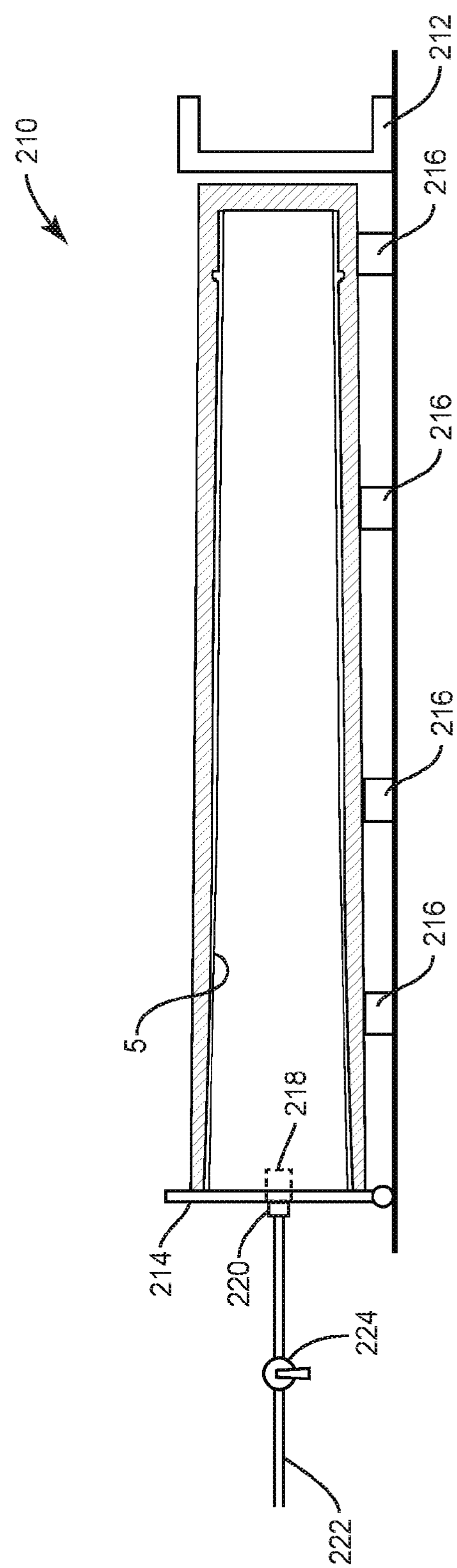
FIGS. 11A-11C illustrate an apparatus for releasing a mold from a molded column.
Figure 11B:
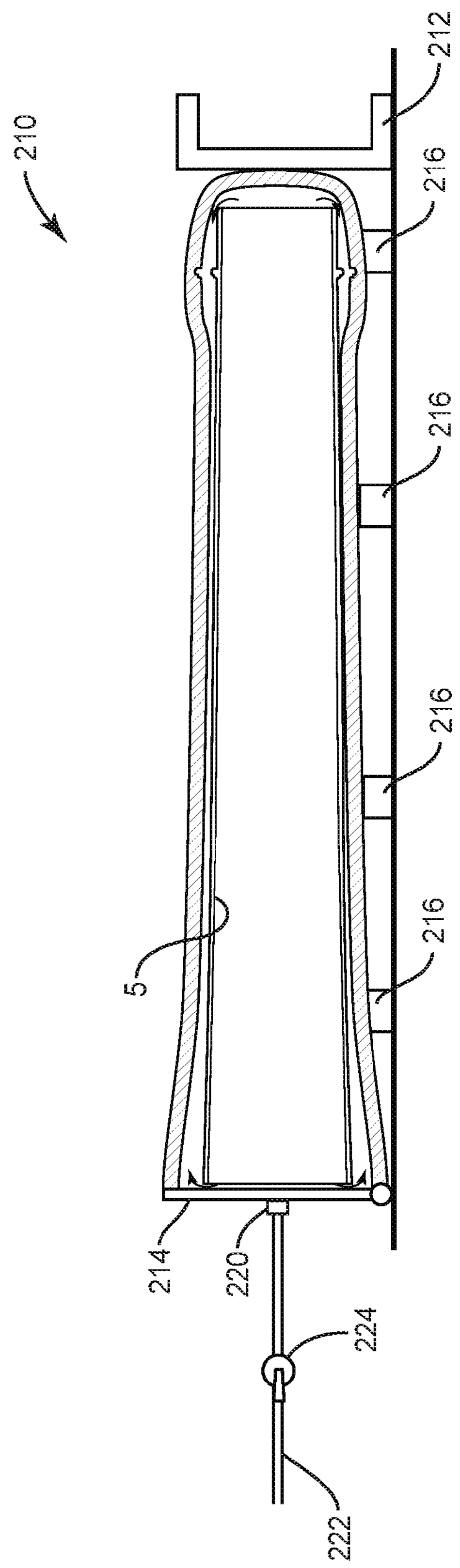

In order to avoid such issues, a separate mold inflation step may be performed prior to the extraction step. FIGS. 11A-110 illustrates an exemplary inflation step. This inflation step may be performed at the same station where the mold 20 is extracted, or at a separate work station. As shown in FIG. 11A, the mold 20 with the molded column 5 formed therein is inserted into a holding fixture 210. The holding fixture 210 includes a backstop 212 and a seal plate 214. The seal plate 214 is pressed against the open end 26 of the mold 20. An air tube 218 including a coupling connects to an air supply line 220 to supply air to the interior of the molded column 5. The air supply line may include a valve 224 for opening and closing the air supply line. When the valve 224 is open, air is applied to the interior of the molded column 5. In a manner similar to that shown in FIGS. 10A-10F, the air flows around the ends of the molded column 5 and infiltrates the space between the exterior surface of the molded column 5 and inner surface 28 of the mold 20. FIG. 11B. The air infiltration causes the sidewall of the mold 20 to expand radially outward so that the inner surface 28 of the mold 20 releases from the exterior surface of the molded column 5 as shown in FIG. 110. After the mold 20 is released from the exterior surface of the molded column 5, the mold 20 may be inserted into the extraction equipment 100 and the molded column 5 may be extracted as previously described.

Figure 11C:
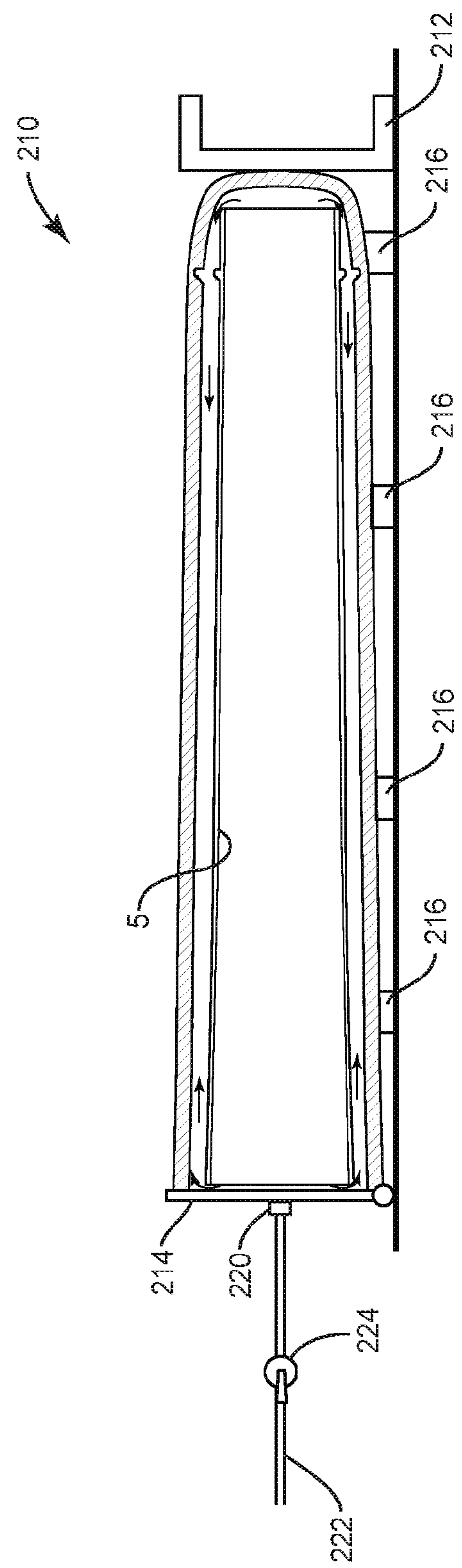

Another problem that may be encountered during the column 5 extraction process is when debris forms on the interior surface of the molded column 5 preventing the insertion of the expandable plug 120. In this case, the mold 20 can be inflated as shown in FIGS. 11A-11C and a gripping tool, referred to herein as a firefly 300, can be used to pull the molded column 5 from the mold 20.

Figure 12:
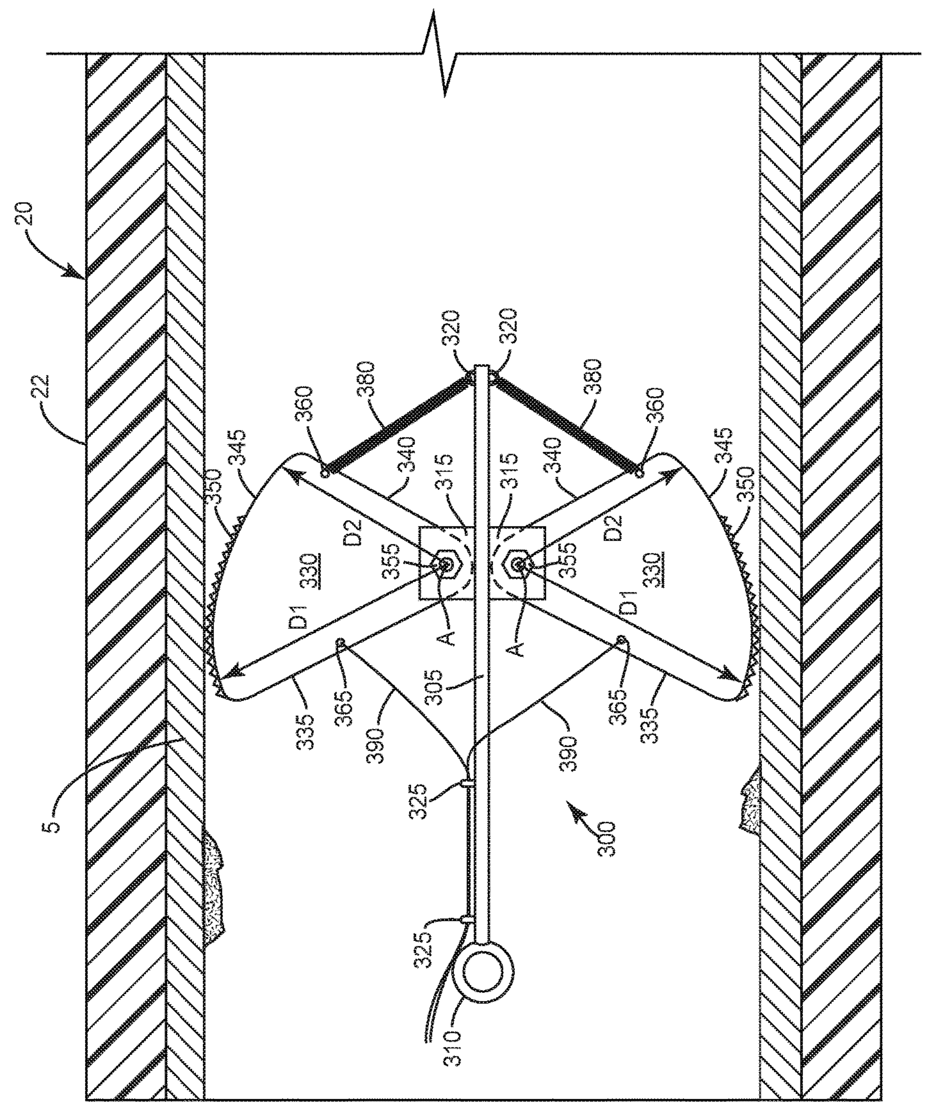
FIG. 12 illustrates an expandable gripping device for pulling a molded column from a mold.

FIG. 12 illustrates an exemplary embodiment of the firefly 300. The main functional elements of the firefly 300 comprise a steel shaft 305 having an eyelet 310 at one end thereof, a pair of wing members 330 pivotally connected to the shaft 305, and a pair of tension springs 380 connected between the shaft at 305 and respective wing members 330 for biasing the wing members 330 to an expanded position. The wing members are configured to expand when pivoted away from the shaft and to retract when pivoted toward the shaft 305.

The wing members 330 are made from a flat steel plate or other suitable material. Mounting brackets 315 are fixedly secured to the shaft 305 to provide a structure for pivotally connecting the wing members 330 to the shaft 305. The wing members 330 are secured by a nut and bolt arrangement 355 that pass through aligned holes (not shown) in the wing members 330 and mounting brackets 315. The wing members 330 include a leading edge 335, a trailing edge 340, and outer edge 345. The outer edge 345 of each wing member 330 is configured to engage an inner surface of the molded column 5 and includes a series of serrations or teeth 350. The outer edge 345 is arcuately shaped so that, moving from the leading edge 335 toward the trailing edge 340, the outer edge 345 gets increasingly closer to a pivot axis A of the wing member 330. That is, a first distance D1 of the outer edge 345 from the pivot axis A at a point adjacent the leading edge 335 of the wing member 330 is greater than a second distance D2 of the outer edge 345 from the pivot axis at a point adjacent the trailing edge 340 of the wing member 330. Due to the shape of the wing members 300, the wing members radially expand when the wing members pivot away from the shaft 305 and retract when the wing members pivot toward the shaft.

A tension spring 380 or other biasing member is connected between each wing member 330 and the end of the shaft 305 opposite the eyelet 310 for biasing the wing members 330 towards an open or expanded position. One end of each spring member 380 connects to a loop 320 secured to the end of the shaft 305, while the opposite end of each spring member 380 connects to a spring hole 360 disposed adjacent a trailing edge 340 of the wing member 330. As will be apparent, the spring members 380 tend to expand or spread the wing members 330 while allowing the wing members 330 to retract inwardly during insertion of the firefly 300 into the interior of a molded column 520.

A release cord 390 is connected to each wing member 330 to aid in releasing tension on the wing members 330 once the extraction of the molded column 5 is complete. The release cords 390 connect at one end to openings 365 adjacent the leading edge 335 of the wing members 330 and pass through guide loops 325 that are fixedly secured to the shaft 305.

In use, the firefly 300 is inserted into the molded column 520 as shown in FIG. 12. During insertion of the firefly 300 into the molded column 520, the wing members 330 will pivot inwardly allowing the firefly 300 to slide into the molded column 520. The tension springs 380 will act to maintain the outer edges 345 of the wing members 330 in contact with the interior surface of the molded column 520.

Once the firefly 300 is inserted into the molded column 520, the hook 166 at the end of the cable 164 is engaged with the eyelet 310 of the firefly 300 and the winch 162 is actuated. The cable 164 and hook 166 apply an axial force to the firefly 300 to the molded column 5 from the mold 20. Due to the geometric arrangement of the firefly 300, the axial pulling force causes the wing members 330 to firmly grip the interior surface of the molded column 5. In general, the greater the axial force applied to the firefly 330, the greater the gripping force will be. Once the column 5 is removed from the mold 20, the release cords 390 may be pulled to release the tension on the wing members 330 so that the firefly 300 can be removed from the interior of the molded column 5.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of making a elongate molded part, said method comprising:

pouring a molding material into a single-piece, elongate tubular mold having a closed end, an open end, and a flexible sidewall; rotating the mold while the molding material sets to form a molded elongate molded part; inserting an expandable plug into the elongate molded part through the open end of the mold; expanding the plug to seal against and grip an inner surface of the elongate molded part; applying air pressure gas to an interior of the molded elongate molded part to expand the mold; and pulling the elongate molded part through the open end of the mold.

2. The method of claim 1 wherein applying air pressure to an interior of the elongate molded part comprises: directing the pressurized gas through the plug into the interior of the elongate molded part.

3. The method of claim 2 wherein expanding the plug to seal against and grip an inner surface of the elongate molded part comprises applying a pressurized gas to an interior of the plug to radially expand the plug.

4. The method of claim 3 wherein the pressurized gas applied to radially expand the plug has a higher pressure that the pressurized gas applied to the interior of the elongate molded part.

5. The method of claim 2 wherein pulling the elongate molded part through the open end of the mold comprises applying an axial force to the expandable plug to pull the elongate molded part through the open end of the mold.

6. The method of claim 5 wherein the axial force is applied by a cable attached to the expandable plug.

7. A system for making elongate molded parts, said system comprising:

a single-piece, elongate tubular mold having a closed end, an open end, and a flexible sidewall; a spinning machine for rotating the mold while the elongate molded part is formed; a mold expanding system for supplying pressurized gas to an interior of the molded part to expand the mold, said mold expanding system comprising:

an expandable plug configured to be inserted into an interior of the elongate molded part and expanded to engage on inner surface of the elongate molded part; and a source of pressurized gas in communication with an interior of the elongate molded part; and a pulling device for pulling the elongate molded part axially through the open end of the mold.

8. The system of claim 7 wherein the expandable plug comprises:

a flexible sidewall;

a first air passage connected to the source of pressurized gas for supplying pressurized gas at a first pressure to the interior of the expandable plug and expand the sidewall of the flexible plug; and a second air passage connected to the source of pressurized gas and extending though the expandable plug for supplying pressurized gas at a second pressure to the interior of the molded column when the expandable plug is inserted in the elongate molded part.

9. The system of claim 8 the pressurized gas supplied to an interior of the expandable plug is greater than the pressurized gas to an interior of the column.

10. The system of claim 7 wherein the pulling device is configured to engage with and apply an axial force to expandable plug to pull the molded part axially through the open end of the mold.

11. The system of claim 10 wherein the pulling device comprises a cable for attaching to the expandable plug and a winch.

* * * * *